United States Patent [19]

Yamamoto et al.

[11] Patent Number: 5,462,975
[45] Date of Patent: Oct. 31, 1995

[54] RUBBER COMPOSITIONS FOR SPONGE RUBBER

[75] Inventors: Keisaku Yamamoto; Kiyoshi Ikeda; Masahiro Fukuyama, all of Chiba, Japan

[73] Assignee: Sumitomo Chemical Co., Ltd., Osaka, Japan

[21] Appl. No.: 339,896

[22] Filed: Nov. 14, 1994

[30] Foreign Application Priority Data

Nov. 16, 1993 [JP] Japan ..................... 5-286610
Mar. 8, 1994 [JP] Japan ..................... 6-036831

[51] Int. Cl.$^6$ .................................... C08J 9/06
[52] U.S. Cl. ................ 521/90; 521/92; 521/94; 521/95; 521/135
[58] Field of Search ................... 521/92, 94, 95, 521/135

[56] References Cited

U.S. PATENT DOCUMENTS 5,274,006  12/1993  Kagoshima et al. ................ 521/135

*Primary Examiner*—Morton Foelak
*Attorney, Agent, or Firm*—Cushman Darby & Cushman

[57] ABSTRACT

A rubber composition for sponge rubber which contains following components (A)–(E) and satisfies the following requirements that the ratio by weight of (A)/(B) is 30/70–99/1 and the amount of component (C) is 50–400 parts by weight per 100 parts by weight of the total amount of components (A) and (B):

(A): Epoxy group-containing acryl elastomer.
(B): Ethylene copolymer which contains a carboxyl group(s) or a carboxylic anhydride group(s).
(C): Hydroxyl compound of II or III group of typical metal element in periodic table.
(D): Vulcanizer.
(E): Foaming agent.

The sponge rubber compositions of the invention can be used for sponge for insulator in the field of electricity, architecture, automobile and the like, because sponge rubber compositions of the invention have the characteristics of good heat resistance, good oil stability, high-foaming property, and good shape-retention.

16 Claims, No Drawings

RUBBER COMPOSITIONS FOR SPONGE RUBBER

This invention relates to a rubber composition for sponge rubber. More particularly, the invention relates to a non-halogen flameproof rubber composition for sponge rubber which has good heat resistance, good oil resistance, high-foaming property and good shape-retention.

As ethylene-acrylate rubber is used for sponge rubber insulator of elelctric products, it is demanded to have good heat resistance, good oil resistance, high-foaming property and good flameproof.

As a method for improving flameproof property of rubber compositions, addition of magnesium hydroxide or aluminium hydroxide to the rubber compositions has been known. However, the addition of a non-halogen flame retardant such as magnesium hydroxide and aluminium hydroxide to a ethylene-acrylate rubber reduces the shape-retention of the rubber: that is, the interaction between the ethylene-acrylate rubber and the non-halogen flame retardants becomes weak, therefore the viscosity of the compound decreases and, as a result, the compound deforms during the vulcanization.

Therefore, it is desired to develop rubber compositions which have good heat resistance, good oil resistance, high-foaming property and good shape-retention.

Under the circumstances, the inventors made an extensive study, seeking a rubber composition which retains a good shape-retention even if a non-halogen flame retardant is added, and found that a rubber composition for a sponge rubber which has good flameproof and good shape-retention can be obtained when a carboxylic acid- or carboxylic anhydride-containing ethylene copolymer and a particular hydroxide(s) are added to an epoxy-group containing acryl elastomer.

Thus the invention provides a rubber composition for sponge rubber which comprises the following components (A)~(E) and satisfies the following requirements that the ratio by weight of (A)/(B) is 30/70–99/1 and the amount of component (C) is 50–00 parts by weight per 100 parts by weight of the total amount of components (A) and (B):

(A): Epoxy group-containing acryl elastomer.

(B): Ethylene copolymer which contains a carboxyl group(s) or a carboxylic anhydride group(s).

(C): Hydroxide of II or III group of typical metal element in periodic table.

(D): Vulcanizer.

(E): Foaming agent.

The invention is illustrated in detail as follow.

The epoxy group-cotaining acryl elastomer, the component (A) is an elastomer made by the copolymerization of epoxy group-containing monomer (as cross-linking points) with at least one acryl monomer having copolymerizable terminal vinyl or vinylidene groups, or made by copolymerization of epoxy group-containing monomer with said acryl mononer and the other monomer copolymerizable with said acryl mononer.

These elastomers can also be made by epoxidizing acryl elastomer, too.

The amount of epoxy group-containing monomer to be reacted is 0.1–10 % by weight, preferably 0.5–3 % by weight, and the amount of acryl mononer having copolymerizable terminal vinyl or vinylidene groups is 90–499.9 % by weight, preferably 97–99.5 % by weight.

The epoxy group-cotaining acryl elastomer is made by the copolymerization of said monomers by known polymerization methods such as emulsion polymerization, suspension polymerization, solution polymerization, bulk polymerization.

Examples of the epoxy group-containing monomers are unsaturated glycidyl esters such as glycidyl acrylate, glycidyl methacrylate, di-glycidyl itaconate, tri-glycidyl butene-tricarboxylate, and glycidyl p-styrene carboxylate. Among them, glycidyl ethers such as vinyl glycidyl ether, allyl glycidyl ether, and methacryl glycidyl ether, in particular glycidyl acrylate, glycidyl methacrylate, and allyl glycidyl ether are preferred.

Examples of the acryl monomers having terminal vinyl or vinylidene groups which are copolymerizable with epoxy group-containing monomers are acrylates such as methyl acrylate, ethyl acrylate, propyl acrylate, n-butyl acrylate, n-octyl acrylate, methoxymethyl acrylate, methoxyethyl acrylate, and ethoxyethyl acrylate, and methacrylates such as methyl methacrylate, ethyl methacrylate, propyl methacrylate, n-butyl methacrylate, n-octyl methacrylate, methoxymethyl methacrylate, and methoxyethyl methacrylate.

The said acryl monomers may contain another copolymerizable monomers. Examples of another monomers copolymerizable with said acryl monomers are vinyl esters such as vinyl acetate, vinyl propionate, and vinyl butyate; vinyl ketones such as methyl vinyl ketone, and ethyl vinyl ketone; vinyl aromatic compounds such as stylene, α-methyl styrene, and vinyl toluene; conjugated dienes such as butadiene, and isoprene; α-mono olefins such as ethylene, propylene, and 1-butene; hydoxyl group-containing vinyl monomers such as β-hydroxyethyl acrylate, and 4-hydroxybutyl acrylate; vinyl or vinylidene monomers with nitrile group such as acrylonitrile, methacrylonitrile, and β-cyanoethyl acrylate. These monomers may be used alone or in combination thereof.

The ratio (mole ratio) of acryl mononers/another copolymerizable monomers is in a range of 100:0~5:95.

Examples of the epoxy group-containing acryl elastomers are epoxy group-containing (meth)acrylate copolymer elastomer, epoxy group-containing ethylene-(meth)acrylate copolymer elastomer, epoxy group-containing ethylene-vinyl acetate-(meth)acrylate copolymer elastomer, epoxy group-containing (meth)acrylate-acrylonitrile copolymer elastomer, and epoxy group-containing butadiene-acrylonitrile-(meth) acrylate copolymer elastomer. Among them, epoxy group-containing ethylene-(meth)acrylate copolymer elastomer is preferred, in particular ethylene-(meth)acrylate-unsaturated glycidyl ester copolymer elastomer is preferred as the component (A).

As the (meth)acrylate, the esters which are obtained from C1–C8 alcohol and (meth)acrylic acid, and examples are methyl acrylate, methyl methacrylate, ethyl acrylate, ethyl methacrylate, n-butyl acrylate, n-butyl methacrylate, tert-butyl acrylate, tert-butyl methacrylate, 2-ethylhexyl acrylate, and 2-ethylhexyl methacrylate. These esters may be used alone or in combination thereof.

The ratio (mole ratio) of ethylene/(meth)acrylate in the ethlene-(meth)acrylate-unsaturated glycidyl ester copolymer rubber is preferably 40:60~85:15, and 58:42~80:20 is more preferred. In the case of excess amount of (meth)acrylate, the brittle point of copolymer is raised, and the property as rubber (elastomer) in the atmosphere of low temperature may be deteriorated. On the other hand, if the ratio is too small, the crystallinity of copolymer may be enhanced and its elasticity may not be high enough as elastomer.

The ratio ( mole ratio ) of unsaturated glycidyl ester in the ethylene-(meth)acrylate-unsaturated glycidyl ester copolymer; that is (ethylene+(meth)acrylate):unsaturated glycidyl ester is preferably 1:0.0005~0.05 and more preferably 1:0.001~0.03.

As the unsaturated glycidyl ester contains epoxy group, the vulcanization can be carried out with various vulcanizers making use of epoxy groups.

The ethylene-(meth)acrylic acid-unsaturated glycidyl ester copolymer rubber used as the component (A) may contain isobutylene, styrene, vinyl acetate, their derivatives and so on, in addition to the ones comprising ethylene, (meth) acrylate and unsaturated glycidyl ester.

As said component (A), the ones of which melt index determined at 190° C. in accordance with JIS K 679is 1 is 0.5~500 g/10min are preferable, and more preferred are those with the melt index of 0.5~50 g/10 min.

If the above-mentioned melt index is too high, strength may become insufficient and elasticity may be inferior. On the other hand, if the index is too low, processability may be inferior.

The ethylene-(meth)acrylate-unsaturated glycidyl ester copolymer rubber which is used as the component (A) can be produced by known polymerization methods, for example, free radical-initiated bulk polymerization, emulsion polymerization, or solution polymerization.

Specific example is the method which is described in Japanese Patent Publication (Koukoku) 46-45085, that is, polymerization is performed at pressure more than 500 kg/cm$^2$ and at temperatures 40°~300° C. in the presence of free radical initiator.

The component (B) of the invention is carboxylic acid or carboxylic anhydride-containing ethylene copolymer.

Examples of the component (B) are ethylene-maleic anhydride copolymer, ethylene-acrylate-maleic anhydride copolymer, ethylene-acrylate-maleic anhydride half ester copolymer, ethylene-vinyl acetate-maleic anhydride copolymer, and ethylene-maleic anhydride half ester copolymer.

The content of ethylene in the copolymers is preferably 30~95 mole % and that of acrylate in the copolymers is preferably 0~65 mole %. The content of maleic anhydride or maleic anhydride half ester is preferably 0.1~5 mole %.

The ethylene-maleic anhydride copolymer may be copolymer which is made by radical polymerization of ethylene and maleic anhydride or its half ester under high pressure, and if necessary, may contain radical-copolymerizable monomer such as vinyl acetate, acrylate; that is methyl methacrylate, ethyl acrylate, butyl acrylate and so on.

In the invention, (A)/(B) weight ratio is 30/70~99/1, preferably 60/40~95/5. If component (B) is too much, the excessive component (B) reacts with metal hydroxide (C) used as flame retardant and the scorching resistance decreases. On the other hand, if component (B) is too little, shape-retention becomes inferior.

The component (C) of this invention is hydroxide of II or III group of typical metal element in periodic table. Examples of the component (C) are magnesium hydroxide, and aluminium hydroxide, and these may be used alone or in combination thereof.

The component (C) is used in amount of 50~400 parts by weight, preferably 50~300 parts by weight per 100 parts by weight of the total amount of the components (A) and (B).

If the component (C) is too little, flame resistance may become low. On the contrary, if the component (C) is too much, a sufficiently high-foaming rate cannot be obtained in producing sponge.

The component (D) of the invention is a vulcanizer which reacts with epoxy group. As the examples, there may be mentioned vulcanizers composed of polyfunctional organic acid, quatery ammonium salt and derivatives of urea, vulcanizers composed of polyfunctional organic acid and quatery ammonium salt, vulcanizers composed of polyfunctional organic acid and polyfunctional amine, vulcanizers composed of polyfunctional amine, vulcanizers composed of polyfunctional amine salt, vulcanizers composed of imidazole compound, vulcanizers composed of organic peroxide and imidazole compound, vulcanizers composed of organic peroxide and polyfunctional amine.

Examples of the polyfunctional organic acid are isocyanuric acid, and eicosyl di-acid. Examples of the quatery ammonium salt are octadodecyl trimethyl ammonium bromide, and cetylpyridinium chloride. Example of the derivatives of urea is N,N-diphenyl urea. Example of the polyfunctional amine is hexamethylene diamine carbamate. Example of the organic peroxide is dicumyl peroxide. Examples of the imidazole compound are 2-methylimidazole, and 2-mercapto benzimidazole.

The optimum amount of vulcanizer can readily be determined by those skilled in the art depending on the temperature and residential time during curing process. Preferable vucanizers are composed of 0.5~10 parts by weight of organic peroxide and 0.5~10 parts by weight of 2-mercapto benzimidazole, respectively, per 100 parts by weight of the total amount of the components (A) and (B). 2-mercapto benzimidazole is preferred as imidazole compound.

The component (E) of the invention is foaming agent, and examples are sodium bicarbonate, sodium carbonate, ammonium bicarbonate, ammonium carbonate, ammonium nitrite, N,N' -dimethyl-N,N'-dinitron terephthalamide, N,N'-dinitroso pentamethylene tetramine, azodicarbonamide, azobisisobutyronitrile, azocyclohexyl nitrile, azodiaminobenzene, barium azodicarboxylate, benzenesulfonylhydrazide, toluenesulfonylhyrazide, p,p'-oxybis(benzenesulfonyl hyrazide), diphenylsulfon-3,3'-disulfonylhydrazide, calcium azide, 4,4'-diphenyldisulfonylazide, and p-toluenesulfonylazide.

The amount of the component (E) is generally 0.5~30 parts by weight, preferably 3~20 parts by weight per 100 parts by weight of the total amount of the components (A) and (B).

If the component (E) is too little, sufficiently high-foaming may not be obtained. On the other hand, if the component (E) is too much, crack may form on the surface of foam body.

Furthermore foaming assistants may be used if necessary.

The component (F): calcium oxide may be added to above-mentioned components (A)~(E) in order to prevent open-cell phenomenon. By adding the component (F), the so-called open-cell phenomenon (foams get together at the time of foaming and large combined-foams are generated, as a result, water-absorption rate of the sponge rubber increases) can be suppressed.

The component (F): calcium oxide may be immersed in oil or treated with fatty acid.

The amount of component (F) is generally 1~20 parts by weight, preferably 3~10 parts by weight per 100 parts by weight of the total amount of the components (A) and (B).

If the component (F) is too little, the suppresive effect of open-cell phenomenon may not be sufficient, and if the component (F) is too much, the effect of improvement by the increments of the component (F) cannot be expected, besides it causes increase of the cost to produce rubber compositions.

The sponge rubber composition of the invention can be obtained, for example, as following methods.

That is; the components (A)~(C) of the invention are mixed, if necessary, together with the component (F): calcium oxide, carbon black, antioxidants, vulcanization accelerator, processing aid, stearic acid, reinforcing agent, filler, plasticizer, softener and the like with a conventional kneading machine such as roller, Banbury mixer and the like, and furthermore, the components (D) and (E), and if necessary, foaming assistant, are added and mixed. Thus-obtained rubber compositions are molded in desired shape and foamed by vulcanization. The vulcanization is performed generally at temperature more than 120° C., preferably 150°~220° C., for 1~30 minutes.

The sponge rubber obtained from the rubber composition of the invention can be used in wide fields by making use of that superior property, and, in particular, preferably used as sponge rubber for insulator in the field of electricity, architecture, automobile and the like.

The sponge rubber compositions of the invention can be used for sponge for insulator in the field of electricity, architecture, automobile and the like, because sponge rubber compositions of the invention have the characteristics of good heat resistance, good oil stability, high foaming property, and good shape-retention.

[EXAMPLES]

The invention is described by way of examples as follows, however the invention is not limited to these examples.

the next place, the above-mentioned compound was formed into tube with the diameter of 11 mm and thickness of 3 mm with 45 mm Φ extruder at hed temperature of 80° C., cylinder temperature of 60° C., and screw rotation of 45 rpm. Thus obtained tube was cured and foamed with Geer oven under the condition given in table 1. The length and the width of the tube were measured after foaming, and its shape retention was evaluated in terms of shape-retention ratio which was obtained as the length/the width×100.

Oxygen index which indicates flame resistance property was measured in accordance with JIS-K-7201. Furthermore foaming property was evaluated with specific gravity of foamed body. And the ratio of open-cell is evaluated by water-absorption rate of the sponge rubber in accordance with ASTM-D1056.

The conditions and results are shown in table 1.

TABLE 1

| | Example | | | | | | | | Comparative Example | |
|---|---|---|---|---|---|---|---|---|---|---|
| | 1 | 2 | 3 | 4 | 5 | 6 | 7 | 8 | 1 | 2 |
| Blending (parts by weight)*1 | | | | | | | | | | |
| (A)*2 | 80 | 80 | 80 | 90 | 90 | 90 | 90 | 90 | 100 | 100 |
| (B)*3 | 20 | 20 | 20 | 10 | 10 | 10 | 10 | 10 | 0 | 0 |
| (C)*4 | 100 | 100 | 100 | 100 | 100 | 200 | 200 | 200 | 100 | 100 |
| (D) | | | | | | | | | | |
| DCPO*5 | 3.2 | 3.2 | 3.2 | 3.2 | 3.2 | 3.2 | 3.2 | 3.2 | 3.2 | 3.2 |
| MCBI*6 | 4.5 | 4.5 | 4.5 | 4.5 | 4.5 | 4.5 | 4.5 | 4.5 | 4.5 | 4.5 |
| (E)*7 | 5 | 10 | 5 | 5 | 10 | 10 | 15 | 15 | 5 | 0 |
| (F)*8 | 0 | 0 | 0 | 0 | 0 | 0 | 0 | 5 | — | — |
| Urea (Foaming assistant) | 0 | 0 | 1 | 0 | 0 | 0 | 0 | 0 | 1 | 0 |
| Evaluation | | | | | | | | | | |
| ML100C*9 | 35.2 | 34.6 | 35.9 | 26.8 | 26.0 | 26.2 | 27.0 | 27.0 | 10.3 | 11.5 |
| Specific gravity (g/cc)*10 | | | | | | | | | | |
| 200 C. × 10 min. Cure | 0.54 | 0.28 | 0.58 | 0.47 | 0.33 | 0.38 | 0.27 | 0.27 | 0.30 | 1.43 |
| 200 C. × 15 min. Cure | — | 0.16 | — | — | — | 0.19 | 0.14 | 0.14 | — | — |
| Oxygen index 200 C. × 10 min. Cure | — | 24.0 | — | — | — | 30.5 | 30.0 | 30.0 | 25.0 | — |
| Shape-retention ratio % | 85.1 | 86.4 | 87.5 | 64.4 | 71.0 | 72.5 | 75.0 | 75.0 | 0 | 0 |
| Water-absorption ratio % | — | — | — | — | — | — | 200 | 50 | — | — |

*1 Norguard 445 (Uniroyal CO.: Antioxidant) 2 parts by weight, stearic acid 1 part by weight and stearyl amine 1 part by weight were used as common blendings in addition to the components shown in table 1.
*2 (A): Ethylene(66 mole %)-methlacrylate(33 mole %)-glycidyl methacrylate(1 mole %) copolymer rubber and its melt index at 190° C. determined by JIS K 6791 is 6.5 g/10 min.
*3 (B): Bondine TX 8030 (Trade name); Ethylene(85 weight %)-maleic anhydride(3.5 weight %)-ethyl acrylate(11.5 weight %) copolymer is made by Sumitomo Chemical CO..
*4 (C): Magnesium hydroxide
*5 DCPO: Dicumylperoxide
*6 MCBI: 2-mercaptobenzimidazole
*7 (E): N,N'-dinitrosopentamethylenetetramine
*8 (F): calcium oxide
*9 ML100C: Moony viscosity of the compound
*10 Specific gravity: Specific gravity of foam body(sponge)

Examples 1~8 and comparative examples 1~2

The components listed in table 1 (excluding foaming agent, foaming assistant and vulcanizer) were kneaded for 5 minutes at 60 rpm of rotor revolution with 1.5 l closed-type mixer adjusted to 80° C. Then, foaming agent, foaming assistant and vulcanizer were added and kneaded with 10 inch-open roll to give rubber composition (compound). In

What is claimed is:

1. A rubber composition for sponge rubber which comprises components (A) through (E) and satisfies the requirements that the ratio by weight of (A)/(B) is 30/70 to 99/1 and the amount of component (C) is 50 to 400 parts by weight per 100 parts by weight of the total amount of components (A) and (B), wherein (A) is an epoxy group-containing acryl elastomer, (B) is an ethylene copolymer which contains a carboxyl group(s) or a carboxylic anhydride group(s), (C) is at least one hydroxide of Group II or III metal in the periodic table, (D) is a vulcanizer, and (E) is a foaming agent.

2. A rubber composition according to claim 1, wherein the component (A) is selected from the group consisting of epoxy group containing (meth)acrylate copolymer elastomer, epoxy group-containing ethylene-(meth)acrylate copolymer elastomer, epoxy group-containing ethylene-vinyl acetate-(meth)acrylate copolymer elastomer, epoxy group-containing (meth)acrylate-acrylonitrile copolymer elastomer, and epoxy group-containing butadiene-acrylonitrile-(meth)acrylate copolymer elastomer.

3. A rubber composition according to claim 2, wherein the component (A) is an epoxy group-containing ethylene-(meth)acrylate copolymer elastomer.

4. A rubber composition according to claim 3, wherein the component (A) is an ethylene(meth)acrylate-unsaturated glycidyl ester copolymer elastomer.

5. A rubber composition according to claim 4, wherein the unsaturated glycidyl ester is selected from the group consisting of glycidyl acrylate, glycidyl methacrylate, di-glycidyl itaconate, tri-glycidyl butene-tricarboxylate, and glycidyl p-styrene carboxylate.

6. A rubber composition according to claim 1, wherein the component (A) is an ethylenemethyl acrylate-glycidyl methacrylate copolymer elastomer.

7. A rubber composition according to claim 1, wherein the component (B) is selected from the group consisting of ethylene-maleic anhydride copolymer, ethylene-acrylate-maleic anhydride copolymer, ethylene-acrylate-maleic anhydride half ester copolymer, and ethylene-maleic anhydride half ester copolymer.

8. A rubber composition according to claim 7, wherein the component (B) is an ethylene-maleic anhydride-ethyl acrylate copolymer.

9. A rubber composition according to claim 1, wherein the component (C) is selected from the group consisting of magnesium hydroxide, aluminum hydroxide and mixtures thereof.

10. A rubber composition according to claim 1, wherein the component (D) is composed of organic peroxides and imidazole compounds.

11. A rubber composition according to claim 10, wherein the imidazole compound is 2-mercapto benzimidazole.

12. A rubber composition according to claim 1, wherein the component (E) is selected from the group consisting of sodium bicarbonate, sodium carbonate, ammonium bicarbonate, ammonium carbonate, ammonium nitrate, N,N'-dimethyl-N,N'-dinitron terephthalamide, N,N'-dinitroso pentamethylene tetramine, azodicarbonamide, azobisisobutyronitrile, azocyclohexyl nitrile, azodiaminobenzene, barium azodicarboxylate, benzesulfonylhydrazide, toluenesulfonyl-hyrazide, p,p'-oxybis(benzenesulfonyl hyrazide), diphenylsulfon-3,3'-disulfonylhydrazide, calcium azide, 4,4'-diphenyldisulfonylazide, and p-toluensulfonylazide.

13. A rubber composition according to claim 1, wherein the component (E) is N,N'-dinitroso pentamethylene tetramine.

14. A rubber composition according to claim 1, wherein the said rubber composition further comprises, as a component (F), calcium oxide, in addition to components (A) through (E) and the amount of the component (F) is 1 to 20 parts by weight per 100 parts by weight of the total amount of component (A) and (B).

15. A rubber composition according to any one of claims 1 to 14, wherein the ratio by weight of (A)/(B) is 60/40 to 95/5 and the amount of component (C) is 50-33 parts by weight per 100 parts by weight of the total amount of components (A) and (B).

16. A sponge rubber insulator obtained by foaming and by vulcanization of the rubber composition of claim 1 at temperatures more than 120° C.

* * * * *